United States Patent [19]

Tomoda et al.

[11] 4,093,014

[45] June 6, 1978

[54] RADIAL PLY PNEUMATIC TIRE HAVING WOVEN MULTIFILAMENT FABRIC REINFORCING PLY

[75] Inventors: Hajime Tomoda, Atsugi; Kenhachi Mitsuhashi; Tuneo Morikawa, both of Hiratsuka, all of Japan

[73] Assignee: The Yokohama Rubber Co., Ltd., Tokyo, Japan

[21] Appl. No.: 688,425

[22] Filed: May 20, 1976

[30] Foreign Application Priority Data

May 27, 1975   Japan .................................. 50-62529

[51] Int. Cl.² ............................................. B60C 15/06
[52] U.S. Cl. .......................... 152/362 CS; 152/354 R; 152/362 R
[58] Field of Search ............. 152/362 R, 362 CS, 354; 139/426 R

[56] References Cited

U.S. PATENT DOCUMENTS

| | | | |
|---|---|---|---|
| 3,013,599 | 12/1961 | Riggs | 152/362 R |
| 3,044,523 | 7/1962 | Drakeford et al. | 152/362 R |
| 3,254,694 | 6/1966 | Sparks et al. | 152/362 R |
| 3,504,212 | 4/1970 | Dusenbury et al. | 139/426 R X |
| 3,612,138 | 10/1971 | Ravenhall | 152/362 R |
| 3,661,692 | 5/1972 | Berczi | 139/426 R X |
| 3,682,223 | 8/1972 | Simpson | 152/362 R |
| 3,941,177 | 3/1976 | Okada et al. | 152/362 R |
| 3,964,533 | 6/1976 | Arimura et al. | 152/362 R |

*Primary Examiner*—Allen N. Knowles
*Assistant Examiner*—Fred A. Silverberg
*Attorney, Agent, or Firm*—Armstrong, Nikaido, Marmelstein & Kubovcik

[57] ABSTRACT

A radial ply pneumatic tire, having a high durability, comprising an improved bead portion thereof which comprises a bead wire bundle, a carcass ply of a metal tire cord fabric and a reinforcing ply, all embedded in a rubber matrix, the reinforcing ply having a portion thereof located in the outside surface layer in the bead portion and comprising a woven multifilament fabric consisting of multifilament warps in a density of 20 to 65 yarns/50 mm and multifilament wefts in a density of 20 to 65 yarns/50 mm and an endmost point of the portion of the reinforcing ply in the outside surface layer of the bead portion is located farther from the bead wire bundle than the endmost point of the carcass ply.

27 Claims, 20 Drawing Figures

RADIAL PLY PNEUMATIC TIRE HAVING WOVEN MULTIFILAMENT FABRIC REINFORCING PLY

The present invention relates to an improved pneumatic tire having a radial ply structure and comprising therein a carcass ply of a metal tire cord fabric. More particularly, the present invention relates to an improved pneumatic tire having a radial ply structure and comprising therein a carcass ply of a metal tire cord fabric an end portion of which ply is turned around a bead wire bundle, and a reinforcing ply for the carcass ply, arranged along the end portion of the carcass ply.

Recently, pneumatic tires of radial ply structure have come into use extensively because of higher durability at high speed, better anti-abrasive property and greater safety of the tire than conventional penumatic tires of bias type. The recent propagation of radial ply pneumatic tires in various fields results in diversification in the use thereof. As a result, some radial tires are frequently used under severe conditions. For example, some pneumatic radial tires are used for heavily loaded vehicles and/or run on bad roads. It is known, however, that conventional pneumatic tires have a disadvantage in that an end portion of the metal tire cord carcass ply turned up around the bead wire bundle and an end portion of the reinforcing ply consisting of a tire cord fabric and arranged along the outside end portion of the carcass ply have a tendency to be separated from the rubber matrix surrounding the plies when the pneumatic tires are deformed under running conditions. Accordingly, it is important to improve the pneumatic tires so as to prevent the separation of the carcass ply from the rubber matrix.

In the conventional pneumatic tire, the portion between the sidewall and the bead region of the tire is comprised of a plurality of constituents such as the rubber matrix, the carcass ply and, if necessary, the reinforcing ply or plies. These constituents are very different in physical properties, for example, rigidity, elasticity and hardness, from each other. Such differences between the constituents causes discontinuous distirubtion of stress created on the constituents when the pneumatic tire is deformed. The discontinuous distribution of stress results in the undesirable separation of the constituents from each other.

In order to prevent the above-mentioned undesirable separation, the following attempts were made for improving conventional pneumatic tires.

(1) The rubber to be used in the tire was modified so that the rubber had physical properties, for example, hardness and Young's modulus, near those of the other constituents present in the tire.

(2) A plurality of reinforcing plies consisting of a metal tire cord fabric were arranged between the end portion of the carcass ply and the sidewall of the tire.

(3) The reinforcing ply or plies were turned up around the end portion of the carcass ply so as to surround the end portion of the carcass ply.

However, in the above-mentioned attempt (1), it was difficult to modify the rubber to the extent that the difference in physical property, such as hardness or Young's modulus, between the rubber and the metal tire cord ply did not cause the above-mentioned undesirable separation.

The above-mentioned attempts (2) and (3) are disclosed in, for example, Japanese Patent Application Publication Nos. 15803/1969 and 44122/1974 and Japanese Patent Application Laying-Open Nos. 20804/1972, 100805/1973, 67302/1974 and 67303/1974. However, these types of the improvements have not yet successed in sufficiently preventing the undesirable separation of the carcass ply from the rubber matrix. The constitutions and features of the conventional pneumatic tires will be illustrated in detail hereinafter.

An object of the present invention is to provide a pneumatic tire of radial structure having a bead portion thereof comprising a carcass ply of a metal tire cord fabric embedded in a rubber matrix and protected from production and enlargement of cracks between the carcass ply and the rubber matrix.

Another object of the present invention is to provide a pneumatic tire of radial structure having a bead portion thereof comprising a carcass ply embedded in a rubber matrix, said pneumatic tire being able to be manufactured with a high efficiency of production at a relatively low cost.

The above-mentioned objects can be attained by a radial ply pneumatic tire of the present invention which has a bead portion thereof comprising, embedded in a rubber matrix, a bead wire bundle, a carcass ply of a metal tire cord fabric located in the inside surface layer of the bead portion, an end portion of said carcass ply being turned up around a bead wire bundle and extending to the outside surface layer of said bead portion, and a reinforcing ply for said carcass ply having at least a portion thereof located in the outside surface layer in the bead portion along the outside end portion of the carcass ply and having an endmost point thereof located farther from the bead wire bundle than the endmost point of the outside end portion of the carcass ply, said reinforcing ply comprising a woven multifilament fabric consisting of multifilament warps in a density of 20 to 65 yarns/50 mm and multifilament wefts in a density of 20 to 65 yarns/50 mm.

The term "metal tire cord fabric" or "metal cord fabric" used herein refers to a conventional tire cord fabric composed of metal cord warps, which are arranged parallel to each other in a density of at minimum 20 yarns/50 mm, and metal cord wefts which intersect the warps at an angle of substantially 90° and are arranged parallel to each other in a very small density of at maximum 7 yarns/50 mm.

Compared with this, the term "woven fabric" in general meaning refers to a woven fabric consisting of warps, which are arranged parallel to each other in a density of at minimum about 20 yarns/50 mm, and wefts, which intersect the warps at an angle of substantially 90° and are arranged parallel to each other in a density of at minimum about 20 yarns/50 mm.

The features and advantages of the present invention will be exemplified and more fully explained in the following description with reference to the accompanying drawings, in which.

Figure 1A:
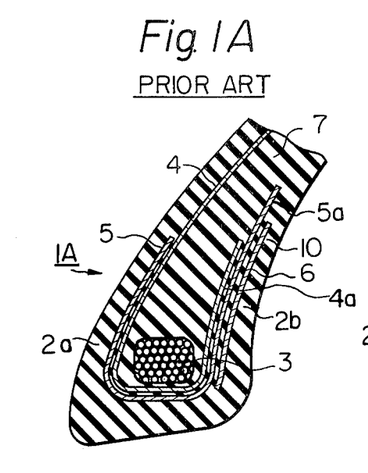
FIGS. 1A and 1B are a schematic cross-sectional view of an embodiment of a bead portion of a conventional pneumatic tire, respectively.
Figure 1B:
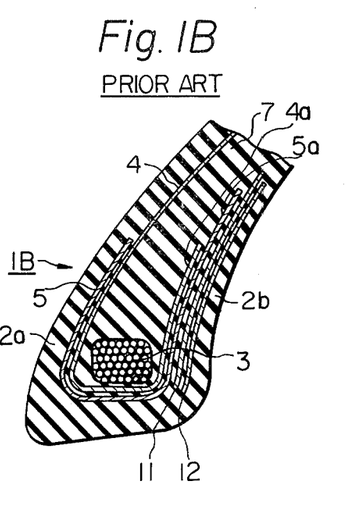

The conventional types of structures of the bead portion of radial ply pneumatic tires are indicated in FIGS. 1A and 1B. Referring to FIG. 1A, a conventional type of bead portion 1A in a pneumatic tire comprises a bead wire bundle 3, a carcass ply 4 of a metal tire cord fabric, reinforcing ply 5 of a metal tire cord fabric and an additional reinforcing ply 6 of a metal tire cord fabric. The bead wire bundle 3 and the plies 4, 5 and 6 are all embedded in a rubber matrix 7. The carcass ply 4 has an inside main portion located in the inside surface layer 2a in the bead portion 1A, a portion turning axially outwardly around the bead wire bundle 3 and an outside end portion 4a extending to the outside surface layer 2b of the bead portion 1A as indicated in FIG. 1A.

The reinforcing ply 5 has an inside end portion located in the inside surface layer 2a in the bead portion along the inside main portion of the carcass ply 4, a portion turning around the turning portion of the carcass ply 4 and an outside end portion 5a located in the outside surface layer 2b in the bead portion along the outside end portion 4a of the carcass ply 4.

The additional reinforcing ply 6 is located between the outside end portion 5a of the reinforcing ply 5 and the outside wall surface of the bead portion along the outside end portion 5a of the reinforcing ply 5.

In the above-mentioned type of bead portion, the outside end portions 4a of the carcass ply 4, the outside end portion 5a of the reinforcing ply 5 and the additional reinforcing ply 6 are much different in rigidity and Young's modulus from the rubber matrix 7. That is, in the above-specified portion of the bead portion 1A, the distribution of ridigity and Young's modulus is discontinuous. Accordingly, if the bead portion is deformed, the stress created in the bead portion due to the deformation is concentrated in the above-specified portion. The concentration of stress results in undesirable separation of the end portions 4a, 5a and 10 from the rubber matrix 7, that is, in formation of undesirable cracks.

It is known from measurement of stress created in the bead portion when a load is applied to the pneumatic tire that the portion including the end portions of the carcass ply 4, the reinforcing ply 5 and the additional reinforcing ply 6, is frequently greatly deformed in a concentration coefficient of stress of 5 to 6. Also, it is known that when a load is applied to the pneumatic tire, the bead portion is sometimes deformed to the extent that the dimensions of the bead portion change 30 to 60% based on the original dimension of the bead portion under a no load condition. It is further known that, when the bead portion is deformed to a change of dimensions of 20 to 40%, it begins to separate the carcass ply from the rubber matrix and the resultant cracks are enlarged.

In order to reduce the influence of the stress created in the specified portion in the bead portion, and attempt was made to locate a plurality of additional reinforcing plies in the outside surface layer in the bead portion.

FIG. 1B shows another type of bead portion. In the drawing, the bead portion 1B contains two additional reinforcing plies 11 and 12 located between the outside wall surface of the bead portion 1B and the outside end portion 5a of the reinforcing ply 5. These additional reinforcing plies 11 and 12 consists of a tire cord fabric. However, it has been found that in spite of the addition of a plurality of tire cord fabric plies to the reinforcing ply 5 consisting of the metal tire cord fabric, the outside end portion 4a of the carcass ply 4 can not be satisfactorily protected from the undesirable separation thereof from the rubber matrix under a load.

Generally, it is possible to analyse a part of the stress created in the tire body by pressurized air in the penumatic tire and a part of the static stress of the tire body created under a static load condition. However, it is difficult to analyse the dynamic stress created in the tire body when a dynamic load is applied to the tire. Due to this difficulty, it is not yet been known how to prevent the undesirable separation of the carcass ply from the rubber matrix when the pneumatic tire is dynamically loaded. The term "dynamic stress" used herein refers to a deformation produced in a tire body when the tire is dynamically loaded, that is, for example, when a vehicle on which the tire is mounted starts to move, travels on a bad road, corners or is braked while moving. The dynamic stress of the tire is very complicated.

In order to protect the outside end portion of the carcass ply from the undesirable separation thereof from the rubber matrix, it is necessary that the reinforcing ply and the additional reinforcing ply be highly resistive to the deformation thereof under dynamic load, so as to absorb the force of deformation in the bead portion. However, the conventional tire cord fabric can be easily deformed, particularly, in the direction of the weft thereof. Accordingly, even when a plurality of additional reinforcing plies consisting of the conventional tire cord fabric are arranged in the bead portion in the manner shown in FIG. 1B, it is difficult to protect the carcass ply from separation. If a crack is produced between the outside end portions of the carcass ply or the reinforcing ply and the rubber matrix, the crack is enlarged over the end portions of the additional reinforcing plies and, then, reaches the wall surface of the tire. This results in breakage of the tire.

Further, it should be noted that the arrangement of a plurality of the additional reinforcing plies results in complicating the manufacturing process for the pneumatic tire, increasing the weight of the tire, decreasing the manufacturing efficiency and increasing the manufacturing cost of the pneumatic tire.

The above-mentioned disadvantages of the conventional pneumatic tire can be eliminated by utilizing of the present invention.

In the pneumatic tire of the present invention, the reinforcing ply for the carcass ply comprises a woven multifilament fabric consisting of multifilament warps in a density of 20 to 65 yarns/50 mm and multifilament wefts in a density of 20 to 65 yarns/50 mm. The warps and wefts may be composed of synthetic multifilaments consisting of a synthetic fiber-forming polymer or a fiber-forming metal. The fiber-forming polymer may be selected from the group consisting of nylon 6, nylon 66 and polyethylene terephthalate. The fiber-forming metal may be steel. In the case where the warps and the wefts in the woven multifilament fabric usable for the present invention consist of the synthetic polymer multifilaments, it is preferable that the warp and the wefts have a denier of 400 to 4000, a tensile strength of 1–30 g/d and an elongation at break of 2 to 50%. That is, it is preferable that each of the warps and wefts is composed of 50 to 2000 filaments each having a denier of 1 to 5.

The synthetic polymer or metal multifilament warp and weft may be composed of one or more twisted or untwisted component multifilament yarns. The woven multifilament fabric can be have any weaving structure as far as the warp and wefts are in the density of 20 to 65 yarns/50 mm. However, it is preferable that the woven multifilament fabric be a plain weave fabric. Also, the woven multifilament fabric may be a twill weave fabric, satin weave fabric, double weave fabric or derivative weave fabric. Further, it is preferable that the woven multifilament fabric has a minimum Young's modulus of 1000 kg/cm$^2$ in a certain direction of the fabric. Still further, it is preferable that the woven multifilament fabric has a ratio of a difference in Young's modulus between a direction in which the fabric exhibits a maximum Young's modulus and a direction in which the fabric exhibits a minimum Young's modulus to the maximum Young's modulus of the fabric of $1 \times 10^4$ or more, more preferably, $1 \times 1.25$ to $1 \times 10^3$ when the woven multifilament fabric is composed of the metal filaments, and of $1 \times 10^3$ or more, more preferably, $1 \times 1.25$ to $1 \times 10^3$ when the woven multifilament fabric is composed of the synthetic polymer filaments.

The construction and feature of the bead portion in the pneumatic tire of the present invention are exemplified in FIGS. 2A to 2E, 3A to 3D and 4A to 4F of the accompanying drawings.

Referring to FIGS. 2A to 2E, all types of the bead portions have one or more reinforcing plies comprising a woven multifilament fabric as specified hereinbefore, but contain no reinforcing ply made of a conventional tire cord fabric.

Figure 2A:
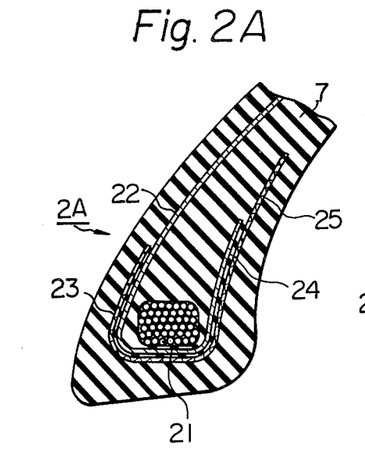
FIGS. 2A through 2E, 3A through 3D and 4A through 4F are respectively schematic cross-sectional view of an embodiment of a bead portion of a pneumatic tire of the present invention.

Referring to FIG. 2A, a bead portion 2A has a bead wire bundle 21, a carcass ply 22 of a metal tire cord fabric and a single reinforcing ply 23. The carcass ply 23 is located in an inside surface layer of the tire in a radial direction and has an end portion 24 thereof turning outwardly around the bead wire bundle 21, extending to the outside surface layer of the bead portion, and terminating therein. The reinforcing ply 23 comprises a woven multifilament fabric specified hereinbefore.

The reinforcing ply 23 has an end portion 25 thereof located in the outside surface layer of the carcass ply along the outside end portion 24 of the carcass ply 22 and the other end portion thereof turning around the turning portion of the carcass ply 22 and extending to the inside surface layer of the bead portion along the carcass ply 22 therein. The outside end portion 25 of the reinforcing ply 23 preferably has a endmost point located 10 to 60 mm farther from the bead wire bundle than the endmost point of the outside end portion 24 of the carcass ply 22.

Figure 2B:
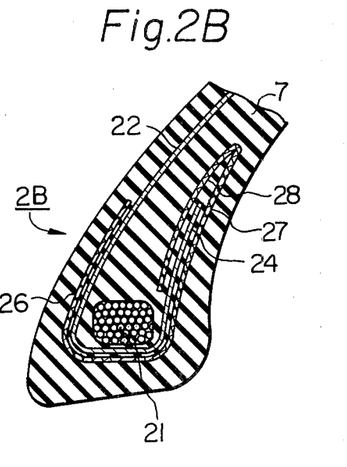

Referring to FIG. 2B, a bead portion 2B is a modification of that indicated in FIG. 2A. In this type of the bead portion 2B, a single reinforcing ply 26 consisting of a woven multifilament fabric specified hereinbefore is located in the same manner as in FIG. 2A, except that an outside end portion 27 of the reinforcing ply 26 has an additional end portion 28 thereof extending from an endmost point of the outside end portion 27 located farther from the bead wire bundle 21 than the endmost point of the outside end portion 24 of the carcass ply 22, toward the bead wire bundle 21 in such a manner that the outside end portion 24 of the carcass ply 22 is interposed between the outside end portion 27 and the additional end portion 28 of the reinforcing ply 26. It is preferable that the endmost point of the outside end portion 27 of the reinforcing ply 26 from which the additional reinforcing ply extends, is located about 10 to 60 mm farther from the bead wire bundle than the endmost point of the outside end portion 24 of the carcass ply 22.

Figure 2C:
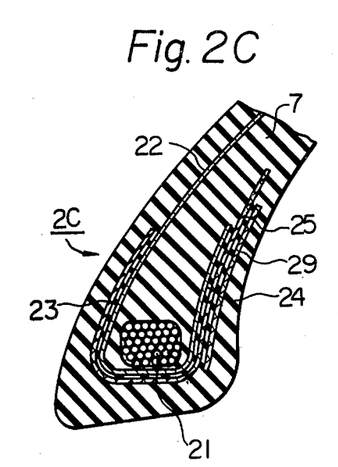

Referring to FIG. 2C, a bead portion 2C is another modification of the bead portion indicated in FIG. 2A. In the drawing, a carcass ply 22 is reinforced by arranging a reinforcing ply 23 comprising a woven multifilament fabric specified hereinbefore, in the same manner as indicated in FIG. 2A and an additional reinforcing ply 29 in such a manner that an outside end portion 25 of the reinforcing ply 23 is interposed between an outside end portion 23 of the carcass ply 22 and the additional reinforcing ply 29. The additional reinforcing ply 29 comprises a woven multifilament fabric consisting of multifilament warps in a density of 20 to 65 yarns/50 mm and multifilament warps in a density of 20 to 65 yarns/50 mm. It is preferable that the endmost point of the outside end portion 25 of the reinforcing ply 23 be located about 10 to 20 mm farther from the bead wire bundle 21 than the endmost point of the additional reinforcing ply 29.

Figure 2D:
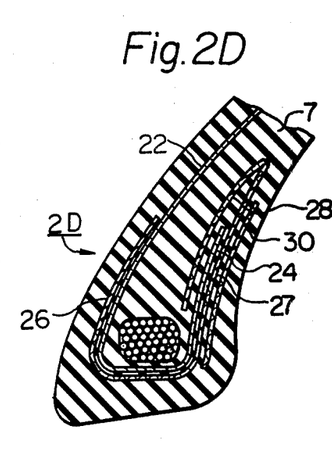

Referring to FIG. 2D, a bead portion 2D is a modification of that indicated in FIG. 2B. In a bead portion 2D in the drawing, a carcass ply 22 and a reinforcing ply 26 are arranged in the same manner as in FIG. 2B, and an additional reinforcing ply 30 is located in the outside surface layer in the bead portion in such a manner that the outside end portion 27 of the reinforcing ply 26 is interposed between the outside end portion 24 of the carcass ply 24 and the additional reinforcing ply 30. The additional reinforcing ply comprises a woven multifilament fabric consisting of multifilament warps in a density of 20 to 65 yarns/50 mm and multifilament wefts in a density of 20 to 65 yarns/50 mm. It is preferable that the endmost point of the outside end portion 27 of the reinforcing ply 26 is located about 10 to 60 mm farther from the bead wire bundle than the endmost point of the additional reinforcing ply 30.

Figure 2E:
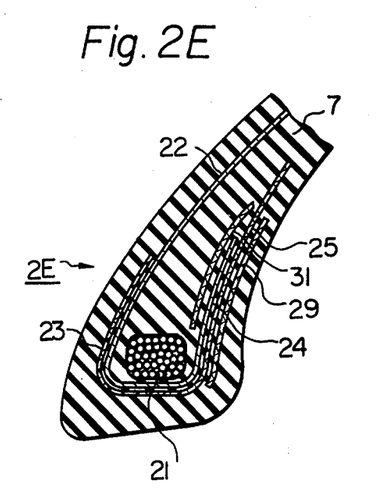

FIG. 2E shows a modification of the bead portion of FIG. 2C. In the drawing, a carcass ply 22, a reinforcing ply 23 and an additional reinforcing ply 29 are located in the bead portion 2E in the same arrangement as in FIG. 2C. In addition to the above-mentioned plies, a further additional reinforcing ply 31 is located along the outside end portion 24 of the carcass ply 22 in such a manner that the outside end portion 24 of the carcass ply 22 is interposed between the further additional reinforcing ply and the outside end portion 25 of the reinforcing ply 23. The further additional reinforcing ply 31 comprises a woven multifilament fabric onsisting of multifilament warps in a density of 20 to 65 yarns/50 mm and multifilament wefts in a density of 20 to 65 yarns/50 mm. It is preferable that the endmost point of the outside end portion of the reinforcing ply be located about 20 to 40 mm farther from the bead wire bundle than the endmost point of the further additional reinforcing ply.

All of the types of bead portions indicated in FIGS. 3A to 3D, contain therein one or more reinforcing plies comprising a woven multifilament fabric specified hereinbefore and one or more additional reinforcing plies comprising a conventional metal tire cord fabric.

Figures 3A, 3B:
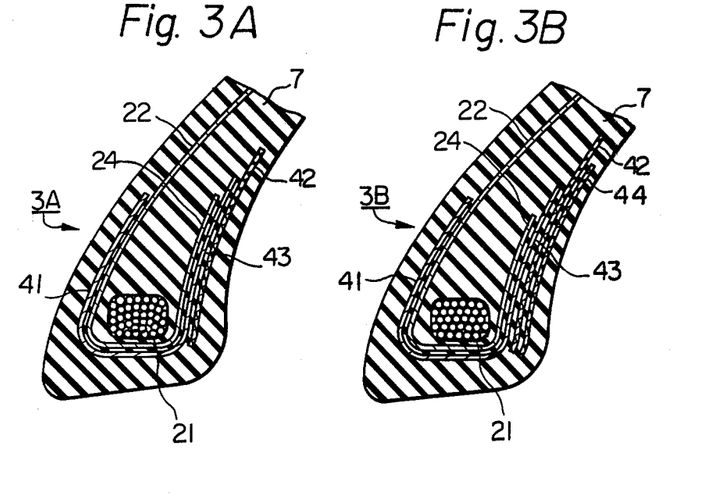

Referring to FIG. 3A, a bead portion 3A has a bead wire bundle 21, a carcass ply 22 of a metal tire cord fabric, a single additional reinforcing ply 41 of a metal tire cord fabric and a single reinforcing ply 42 of a woven multifilament fabric specified hereinbefore. The carcass ply 22 is arranged in the same manner as in FIG. 2A and has an outside end portion 24 thereof located in the outside surface layer of the bead portion 3A. The additional reinforcing ply 41 has an outside end portion 43 thereof located in the outside surface layer of the bead portion 3A along the outside end portion 24 of the carcass ply 22, and the other end portion thereof turning around the turning portion of the carcass ply 22 and extending to the inside surface layer of the bead portion 3A. The reinforcing ply 42 is located in the outside surface portion of the bead portion 3A along the outside end portion 24 of the carcass ply 22 in such a manner that the outside end portion of the additional reinforcing ply 41 is interposed between the outside end portion 24 of the carcass ply 22 and the reinforcing ply 43. It is preferable that the endmost point of the reinforcing ply 43 be located about 10 to 60 mm farther from the bead wire bundle 21 than the endmost point of the outside end portion 43 of the additional reinforcing ply 41. Also, it is preferable that the endmost point of the outside end portion 43 of the additional reinforcing ply 41 be farther from the bead wire bundle 21 than the endmost point of the outside end portion 24 of the carcass ply 22.

Referring to FIG. 3B, a bead portion 3B comprises a carcass ply 22 of a metal tire cord fabric, a reinforcing ply 42 of a woven multifilament fabric specified hereinbefore, an additional reinforcing ply 41 of a metal tire cord fabric and a further additional reinforcing ply 44 of a woven multifilament fabric. The further additional reinforcing ply 44 comprises a woven multifilament fabric consisting of multifilament warps in a density of 20 to 65 yarns/50 mm and multifilament wefts consisting of a density of 20 to 65 yarns/50 mm, and arranged in the outside surface layer of the bead portion 3B in such a manner that the reinforcing ply is interposed between the outside end portion 43 of the additional reinforcing ply 41 and the further additional reinforcing ply 44. In this type of the bead portion 3B, it is preferable that the endmost point of the reinforcing ply 42 be located about 10 to 20 mm farther from the bead wire bundle 21 than the endmost point of the further additional reinforcing ply 44.

Figure 3C:
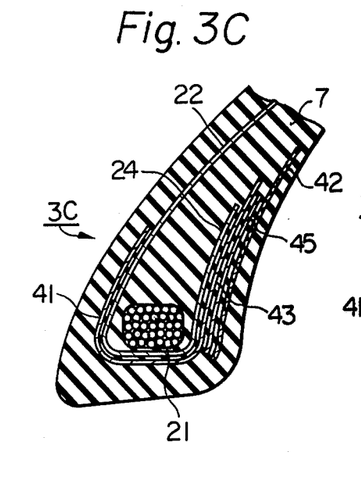

Referring to FIG. 3C, a bead portion 3C is a modification of the bead portion indicated in FIG. 3A. In the bead portion 3C, a carcass ply 22 of a metal tire cord fabric, a reinforcing ply 42 of a woven multifilament fabric and an additional reinforcing ply 41 of a metal tire cord fabric are arranged in the same manner as in FIG. 3A, and a further additional reinforcing ply 45 of a metal tire cord fabric is inserted between the outside end portion 43 of the additional reinforcing ply 41 and the reinforcing ply 42. In this type of the bead portion, it is preferable that the endmost portion of the outside end portion 43 of the additional reinforcing ply 41 be located about 10 to 20 mm farther from the bead wire bundle than the endmost point of the further additional reinforcing ply 45.

Figure 3D:
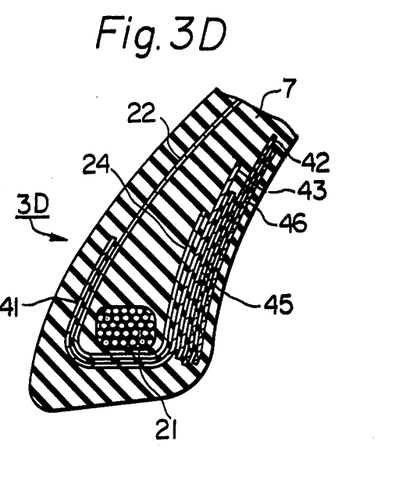

Referring to FIG. 3D, a bead portion 3D is a modification of the bead portion 3C in FIG. 3C. In the bead portion 3D, a carcass ply 22 of a metal tire cord fabric, a reinforcing ply 42 of a woven multifilament fabric specified hereinbefore, an additional reinforcing ply 41 of a metal tire cord fabric and a further additional reinforcing ply 45 of a metal tire cord fabric are in the same arrangement as in FIG. 3C. The bead portion 3D comprises, in addition to the above-mentioned plies, a still further additional reinforcing ply 46 of a woven multifilament fabric consisting of multifilament worps in a density of 20 to 65 yarns/50 mm and multifilament wefts in a density of 20 to 65 yarns/50 mm. The still further additional reinforcing ply 46 is located in the outside surface layer in the bead portion 3D in such a manner that the reinforcing ply 42 is interposed between the further additional reinforcing ply 45 and the still further additional reinforcing ply 46. In this type of arrangement, it is preferable that the endmost point of the reinforcing ply 42 be located about 10 to 20 mm farther from the bead wire bundle than the endmost point of the still further additional reinforcing ply 46.

Other embodiments of the bead portions in the pneumatic tires of the present invention will be illustrated with reference to FIGS. 4A through 4F.

Figure 4A:
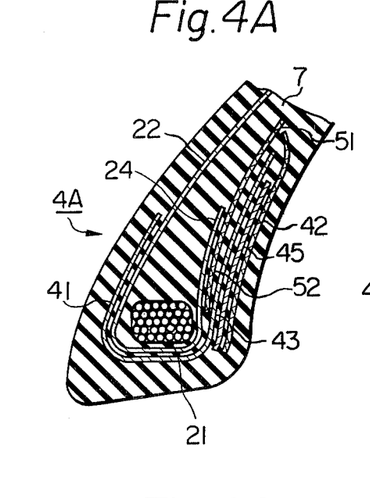

FIG. 4A shows a modification of the bead portion indicated in FIG. 3C. That is, in the drawing, a bead portion 4A has a carcass ply 22 of a metal tire cord fabric, a reinforcing ply 42 of the woven multifilament fabric specified hereinbefore, an additional reinforcing ply 41 of a metal tire cord fabric and a further additional reinforcing ply 45 of a metal tire cord fabric, in the same arrangement as in FIG. 3C. In addition to the above-mentioned plies, the bead portion 4A comprises a still further additional reinforcing ply 51 of a woven multifilament fabric consisting of multifilament warps in a density of 20 to 65 yarns/50 mm and multifilament wefts in a density of 20 to 65 yarns/50 mm. The still further additional reinforcing ply 51 is located in the outside surface layer of the bead portion in such a manner that an end portion 52 of the still further additional reinforcing ply 51 is inserted between the outside end portion 24 of the carcass ply 22 and the outside end portion 43 of the additional reinforcing ply 41. In this type of bead portion, it is preferable that an endmost point of the still further additional reinforcing ply 51 be located about 10 to 20 mm farther from the bead wire bundle than an endmost point of the reinforcing ply 42.

Figure 4B:
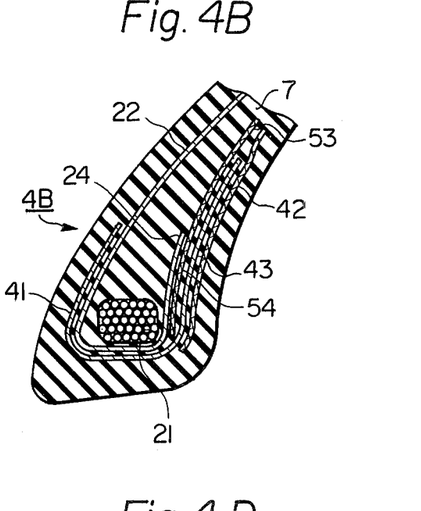

FIG. 4B shows a modification of the bead portion of FIG. 3A. That is, in addition to the same arrangement of a carcass ply 22 of a metal tire cord fabric, a reinforcing ply 42 of the specified woven multifilament fabric and an additional reinforcing ply 41 of a metal tire cord fabric as in FIG. 3A, a further additional reinforcing ply 53 is located in the outside surface layer in the bead portion 4B in such a manner than an end portion 54 of the further additional reinforcing ply 53 is inserted between the outside end portion 24 of the carcass ply 22 and the outside end portion 43 of the additional reinforcing ply 41. The further additional ply 53 comprises a woven multifilament fabric consisting of multifilament warps in a density of 20 to 65 yarns/50 mm and multifilament wefts in a density of 20 to 65 yarns/50 mm. It is preferable that the endmost point of the further additional reinforcing ply 53 be located about 10 to 20 mm farther from the bead wire bundle than the emdmost point of the reinforcing ply 42.

Figures 4C, 4D:
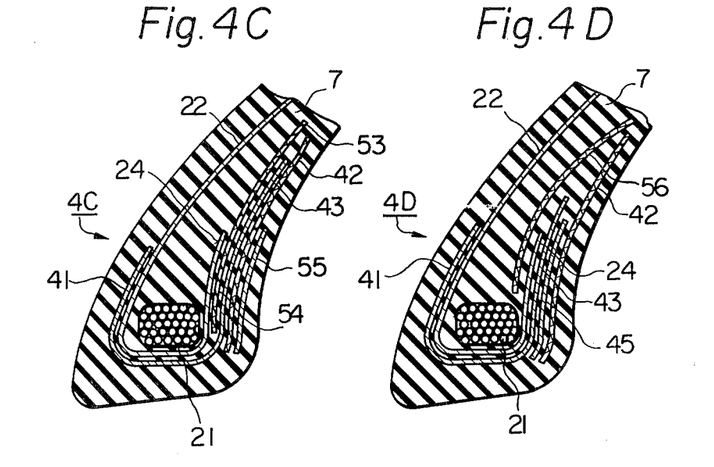

FIG. 4C shows a modification of the bead portion in FIG. 4B. That is, in a bead portion 4C, a carcass ply 22 of a metal tire cord fabric, a reinforcing ply 42 of the specified woven multifilament fabric, an additional reinforcing ply 41 of a metal tire cord fabric and a further additional reinforcing ply 53 of the specified woven multifilament fabric are arranged in the same manner as in FIG. 4B, and; a still further additional reinforcing ply 55 of a metal tire cord fabric is located in the outside surface layer of the bead portion 4C in much a manner that the reinforcing ply 42 is interposed between the outside end portion 43 of the additional reinforcing ply 41 and the still further additional reinforcing ply 55. In this arrangement, it is preferable that the endmost point of the still further additional reinforcing ply 55 be located about 10 to 60 mm closer to the bead wire bundle 21 than the endmost point of the reinforcing ply 42.

FIG. 4D shows a modification of the bead portion 3C in FIG. 3C. That is, in a bead portion 4D, a carcass ply 21 of a metal tire cord fabric, a reinforcing ply 43 of the specified woven multifilament fabric, an additional reinforcing ply 41 of a metal tire cord fabric and a further additional reinforcing ply 45 of a metal tire cord fabric are located in the same arrangement as in FIG. 3C, and; a still further additional reinforcing ply 56 is located in the outside surface layer in the bead portion 4D in such a manner that the outside end portion 24 of the carcass ply 22 is interposed between the still further additional reinforcing ply 56 and the outside end portion 43 of the additional reinforcing ply 41. The still further additional reinforcing ply 56 comprises a woven multifilament fabric consisting of multifilament warps in a density of 20 to 65 yarns/50 mm and multifilament wefts in a density of 20 to 65 yarns/50 mm. In this type of arrangement, it is preferable that the endmost point of the still further additional woven fabric reinforcing ply 56 be located about 10 to 20 mm farther from the bead wire bundle than the endmost point of the reinforcing ply 42.

Figure 4E:
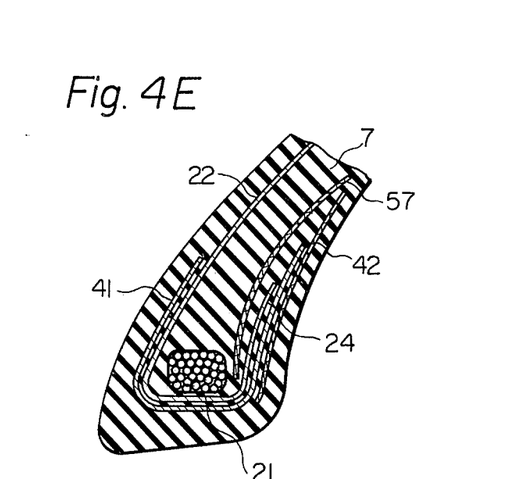

FIG. 4E shows another modification of the bead portion in FIG. 3A. That is, in a bead portion 4E, a carcass ply 22 of a metal tire cord fabric, a reinforcing ply 42 of the specified woven multifilament fabric and an additional reinforcing ply 41 of a metal tire cord fabric are arranged in the same manner as in FIG. 3A, and; a further additional reinforcing ply 57 is located in the outside surface layer in the bead portion 4E in such a manner that the outside end portion 24 of the carcass ply 22 is interposed between the further additional reinforcing ply 57 and the outside end portion 43 of the additional reinforcing ply 41. The further additional reinforcing ply 57 comprises a woven multifilament fabric consisting of multifilament warps in a density of 20 to 65 yarns/50 mm and multifilament wefts in a density of 20 to 65 yarns/50 mm. In this type of the bead portion, it is preferable that the endmost point of the further additional reinforcing ply 57 be located about 10 to 20 mm farther from the head wire bundle 21 than the endmost point of the reinforcing ply 42.

Figure 4F:
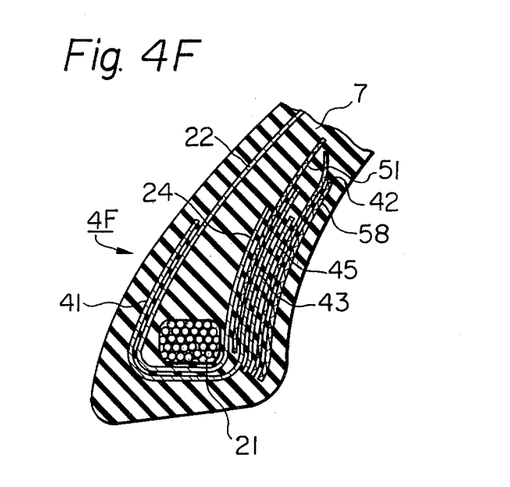

FIG. 4F shows a modification of the bead portion in FIG. 4A. In a bead portion 4F, a carcass ply 22 of a metal tire cord fabric, a reinforcing ply 42 of the specified woven multifilament fabric, an additional reinforcing ply 41 of a metal tire cord fabric, a further additional reinforcing ply 45 of a metal tire cord fabric and a still further additional reinforcing ply 51 of the specified woven multifilament fabric are arranged in the same manner as in FIG. 4A, and; a supplementary reinforcing ply 58 is located in the outside surface layer of the head portion 4F between the outside wall surface of the bead portion 4F and the reinforcing ply 42. The supplementary reinforcing ply 58 comprises a woven multifilament fabric consisting of multifilament warps in a density of 20 to 65 yarns/50 mm and multifilament wefts in a density of 20 to 65 yarns/50 mm. In this type of the bead portion, it is preferable that the endmost point of the supplementary reinforcing ply 58 be located about 10 to 20 mm closer to the bead wire bundle than the endmost point of the reinforcing ply 42.

By arranging the reinforcing ply or plies of the specified woven multifilament fabric close to the outside end portion of the carcass ply in accordance with the present invention, the outside end portion, especially, the endmost portion of the carcass ply can be highly protected from the separation thereof from the rubber matrix. This is due to the high resistance of the woven multifilament fabric to deformation. Accordingly, in the bead portion according to the present invention, even when the bead portion is deformed under a load, the stress created at the end portions of the carcass ply and the conventional reinforcing plies of the metal tire cord fabric is in a coefficient of concentration of stress of 3 to 4 or less.

The above-mentioned effect of the reinforcing ply according to the present invention will be illustrated in more detail with reference to Table 1.

Table 1

| Reinforcing ply | Angle (degree) | | |
|---|---|---|---|
| | 60 | 45 | 30 |
| Conventional reinforcing ply of tire cord fabric | 1.00 | 4.01 | 12.50 |
| Reinforcing ply of the present invention of woven multifilament fabric | 18.30 | 11.51 | 18.30 |

Table 1 indicates ratios in Young's modulus of a conventional reinforcing ply of a tire cord fabric and the reinforcing ply of the specified woven multifilament fabric of the present invention at an angle of 60°, 45° and 30° from the direction of warps thereof to the conventional reinforcing ply of the tire cord fabric at an angle of 60° from the direction of warps thereof. The conventional reinforcing ply comprises a tire cord fabric consisting of warps in a density of 20–70 yarns/50 mm and wefts in a density of 2–7 yarns/50 mm and coated with rubber. The reinforcing ply according to the present invention comprises a woven multifilament fabric consisting of 400–4000 denier nylon 6 multifilament warps in a density of 20–65 yarns/50 mm and 400–4000 denier nylon 6 multifilament wefts in a density of 25–65 yarns/50 mm.

From Table 1, it is evident that when the conventional tire cord reinforcing ply is strained in a direction, the smaller the angle between the direction of the strain and the direction of warp thereof, the larger the Young's modulus of the reinforcing ply in the direction of the strain. That is, the larger the angle between the direction of the strain and the direction of the warps of the time cord fabric, the smaller the resistance of the ply to deformation. Compared with this, when the reinforcing ply of the specified woven multifilament fabric of the present invention is strained in a direction, the Young's modulus of the ply is minimum at an angle of 45° between the direction of the strain and the direction of the warp of the fabric. Also, it is evident that, in the reinforcing ply of the specified woven multifilament fabric, the larger or the smaller the angle between the direction of the strain and the direction of the warps of the fabric, the larger the Young's modulus of the ply in the direction of the strain. That is, the resistance of the ply to deformation is minimum in the direction of the strain at an angle of 45° from the direction of the warps of the woven fabric, and the farther from the above-mentioned direction of 45°, the larger the resistance of the ply to deformation.

However, it should be noted that in the conventional reinforcing ply of the tire cord fabric, the ratio in Young's modulus of the direction of the strain at an angle of 30° to the direction of the strain at an angle of 60° is 12.5 and the ration in Young's modulus of the direction of the strain at an angle 45° to the direction of the strain at an angle of 60° is 4.01. That is, in the conventional reinforcing ply, the Young's modulus of the ply largely varies depending on the direction of the strain. Compared with this, in the case of the reinforcing ply of the specified woven multifilament fabric, the variation in Young's modulus of the ply depending on the variation in the direction of the strain is very small. This means that the reinforcing ply of the specified woven multifilament fabric is highly resistive to deformation in every direction of strain. In other words, the reinforcing ply of the present invention can prevent the undesirable separation of the end portion of the carcass ply from the rubber matrix even when the tire is complicatedly deformed under a heavy load.

In order to illustrate the effect of the bead portion of the present invention in reducing the deformation of the bead portion under a load, the following test was carried out. A standard line was marked on the side surface of a tire, including the bead portion and shoulder portion of the tire, from a rotational axis of the tire to a point on the tread surface of the tire. At said point the tire was brought into contact with a horizontal testing base surface under a no load condition. Several testing lines were marked on the tire side surface, from the axis of the tire to points on the tread surface of the tire with a predetermined angle from the above standard line under a no load condition.

A plaster was applied onto the tire side surface, solidified and, thereafter, removed from the side surface to record the standard line and the tesing lines on the plaster cast surface under a no load condition of the tire. Thereafter, the tire was placed under a predetermined heavy load. Due to the heavy load, the lower portion of the tire was deformed and, therefore, the angles between the standard line and the testing lines on the side surface of the tire were altered. Under the loaded condition, the plaster was applied onto the side surface of the tire, solidified, and, thereafter, removed therefrom. The standard line and testing lines were recorded on the plaster cast surface. By comparing the testing lines recorded under no a load condition on the plaster cast surface with those under a load, the angles between the testing lines under no load and the testing lines under a load were determined.

Figure 5:
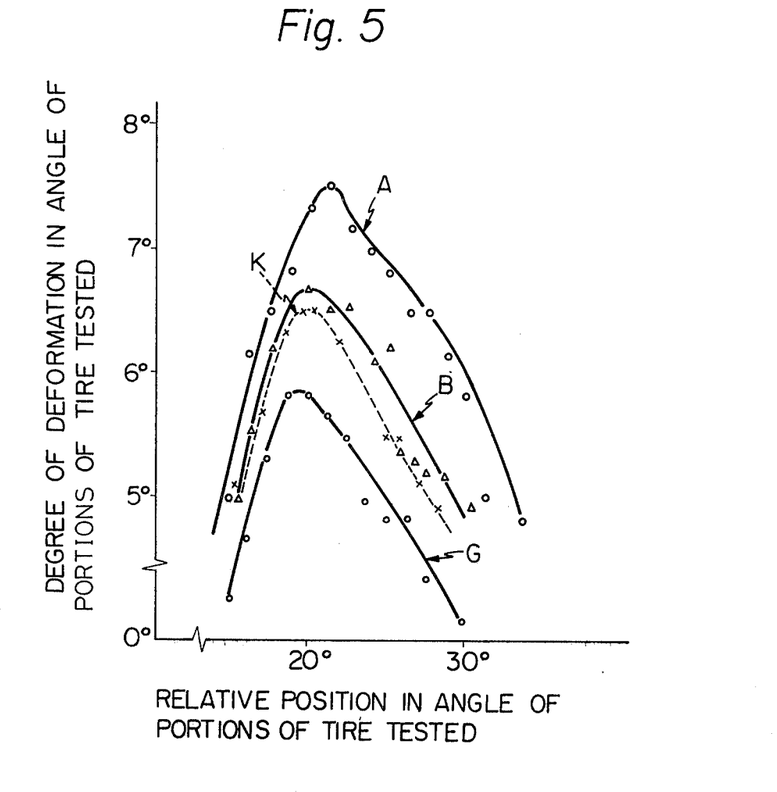
FIG. 5 is a diagram showing relations between amount in angle of deformation of portions of penumatic tires and locations of the portions of the tires under a load.

FIG. 5 shows the relationships of the angle between the standard line and a testing line to the angle between the testing line under no load and that under a load. The former angle represents the relative position of the portions of the tire to be tested and the latter angle represents the degree of deformation of the tested portion of the tire. In FIG. 5, Curves A, B, K and G, respectively show the above-mentioned relationships concerning tires having the bead portions indicated in FIGS. 1B, 3A, 2C and 4A. From the drawing, it is evident that the bead portions of the tires according to the present invention (Curves B, K and G) have smaller deformations under a load than that of the prior art (Curve A). That is, the specified woven multifilament fabric used as the reinforcing ply in the bead portion is very effective to reduce the degree of deformation of the bead portion under a load.

Figure 6:
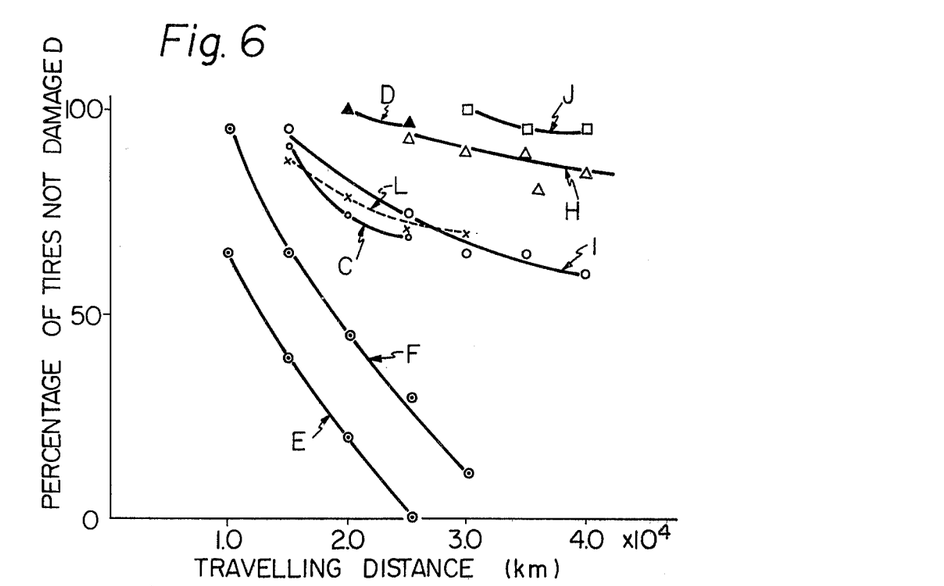
FIG. 6 is a diagram showing relations of travelling distances of penumatic tires to percentages of the pneumatic tires in which separation of the carcass ply from the rubber matrix occurs.

In order to compare the durability of the tire of the present invenion with that of the prior art, a durability test was carried out by using a rotating drum testing machine in a testing room. In this test, a tire was set up on a rotating drum under a load so as to allow the tire to rotate with the drum. FIG. 6 shows a relationship of a travelling distance of the tire on the testing drum to percentage in number of tires not damaged due to the separation of the carcass ply in the bead portion from the rubber matrix during the testing. In FIG. 6, Curves C, D, H, I, J and L, respectively show the above-mentioned relationship concerning the tires having the bead portion of the present invention indicated in FIGS. 3B, 3D, 6A, 6C, 6F and 2C, and Curves E.and F show the relationship concerning the tires having the bead portion of the prior arts indicated in FIGS. 1A and 1B, respectively. From FIG. 6, it is clear that the tires of the present invention have a remarkably higher percentage in number of tires not damaged during the long distance running test than that of the tires of the prior arts.

That is, the tires having the bead portions indicated in FIGS. 3D, 4F and 4A, including the reinforcing ply or plies of the specific multifilament fabric, have an excellent durability even after running over 20,000 km on the testing drum. Further, it is noted from FIG. 6 that the tire having the bead portion indicated in FIG. 3B, which includes two reinforcing plies of the specified woven multifilament fabric, has a very much higher durability than the tire with the bead portion indicated in FIG. 1B, which includes two reinforcing plies of the conventional tire cord fabric. That is, the durability of the tire having the bead portion of FIG. 3B (Curve C) is about 1.3 to about 1.4 times that of FIG. 1B (Curve F) and the durability of the tire having the bead portion of FIG. 3D is about 1.55 to about 1.60 times that of FIG. 1B.

Referring to Curve J in FIG. 6, the tires having the bead portion of FIG. 4F, which includes three reinforcing plies of the specified multifilament fabric, were not damaged after running over 30,000 km and a very small number of the tires were damaged after running 40,000 km.

Additionally, it should be noted that each of the Curves C, D, H, I, J and L, relating to the present invention, has a smaller inclination than that of Curves E and F, relating to the prior arts. This shows the fact that even when cracks are produced in the bead portion due to separation of the carcass ply from the rubber matrix, the cracks are not allowed to enlarge over the reinforcing ply or plies of the specified woven multifilament fabric.

From the above-mentioned results indicated in FIG. 6, it is obvious that the reinforcing ply of the specified multifilament fabric, located close to the outside end portion of the carcass ply, is very effective for preventing the separation of the outside end portion of the carcass ply from the rubber matrix, and also effective to prevent, when cracks are produced between the outside end portion of the carcass ply and the rubber matrix, the enlargement of the cracks.

In the bead portion of the present invention, the reinforcing ply of the specified multifilament fabric has an endmost point located farther from the bead wire bundle than the endmost point of the outside end portion of the carcass ply. The difference between the distance from the bead wire bundle to the endmost point of the reinforcing ply and the distance between the bead wire bundle to the endmost point of the outside end portion of the carcass ply is substantially the same as the distance ($\alpha$) from the endmost point of the reinforcing ply and the endmost point of the outside end portion of the carcass ply.

Figure 7:
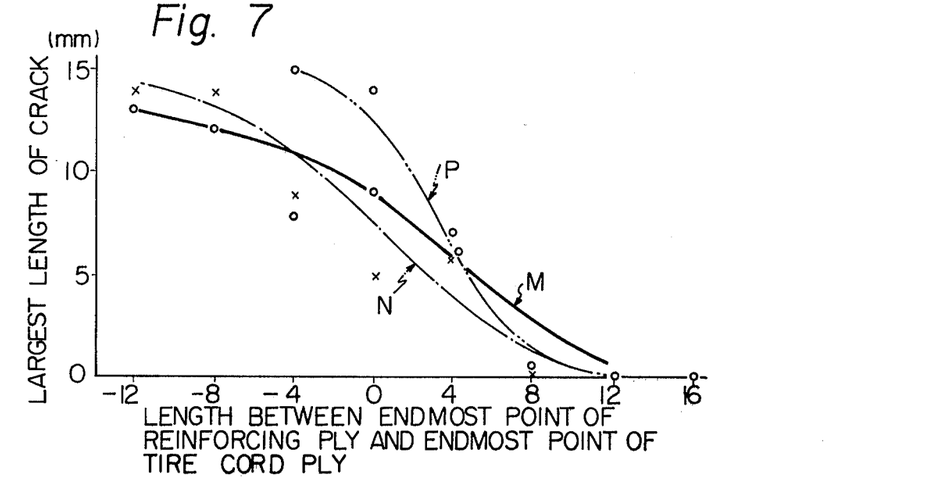
FIG. 7 is a diagram showing relations of the lengths between the endmost points of reinforcing plies of the woven multifilament fabric and the endmost points of metal tire cord plies to the largest lengths of cracks produced by the separation of the carcass plies from the rubber matrix.

In order to illustrate the effect of the distance ($\alpha$) between the above-mentioned endmost points, several tires having bead portions were subjected to tests in which the tires were rotated under a load so as to run 10,000 km, and the maximum length of cracks produced in the tire were measured. The tires had bead portions of the type in FIG. 2C, which includes a carcass ply 22 of the metal tire cord fabric, a reinforcing ply 23 and an additional reinforcing ply 29 of the specified woven multifilament fabric, and the distance between the endmost point of the carcass ply 23 and the endmost point of the reinforcing ply 23 was varied in a range from −12 to 16 mm. When the distance is in a negative (−) number, the endmost point of the carcass ply is farther from the bead wire bundle than the endmost point of the reinforcing ply. The results of the tests are indicated by Curve P in FIG. 7. From Curve P, it is evident that crack in the bead portion are not produced when the endmost point of the reinforcing ply is 10 mm or more farther from the bead wire bundle than the endmost point of the carcass ply.

The same type of tests were conducted on the tires of the type in FIGS. 3C and 4B by varying the distance from the endmost point of the additional reinforcing ply of the metal tire cord fabric to the endmost point of the reinforcing ply of the specified multifilament fabric. Curves M and N in FIG. 7 relate to the tires having the bead portions of the type in FIGS. 3C and 4B, respectively. The curves clearly show the fact that, when the endmost point of the reinforcing ply is about 10 mm farther from the bead wire bundle than the endmost point of the additional reinforcing ply, the bead portions are substantially free from the production of crack.

What we claim is:

1. A radial ply pneumatic tire having a bead portion having an inside portion and an outside portion thereof comprising, embedded in a rubber matrix,
   (a) a bead wire bundle;
   (b) a carcass ply of a metal tire cord fabric located in the inside surface layer of the bead portion and having an end portion thereof being turned around said bead wire bundle and extending to the outside surface layer of the bead portion,
   (c) one or more reinforcing plies arranged between a portion of said carcass ply extending to the outside surface layer of the bead portion and the outer surface of the outside surface layer of the bead portion, and
   (d) an additional reinforcing ply having an outside end portion thereof located between the portion of said carcass ply extending to the outside surface layer of the bead portion and said reinforcing ply and the other portion thereof being turned around the turned portion of the carcass ply and extending to the inside surface layer of the bead portion along the carcass ply,
   characterized in that one of said reinforcing plies, which is located closest to the outer surface of the outside surface layer of the bead portion, comprises a woven multifilament fabric consisting of multifilament warps in a density of 20 to 65 yarns/50mm and multifilament wefts in a density of 20 to 65 yarns/50mm, and has an endmost point thereof located farther from the bead wire bundle than the endmost point of the outside end portion of said carcass ply.

2. A pneumatic tire as claimed in claim 1, wherein said warps and wefts of said woven multifilament fabric are composed of synthetic multifilaments consisting of a fiber-forming polymer.

3. A pneumatic tire as claimed in claim 2, wherein said fiber-forming polymer is selected from the group consisting of nylon 6, nylon 66 and polyethylene terephthalate.

4. A penumatic tire as claimed in claim 3, wherein said woven multifilament fabric consisting of said fiber-forming polymer has a difference in Young's modulus of $10^6$ kg/cm$^2$ or less between a direction in which the fabric exhibits a maximum Young's modulus and a direction in which the fabric exhibits a minimum Young's modulus.

5. A penumatic tire as claimed in claim 4, wherein said difference in Young's modulus is in a range from $10^3$ to $10^6$ kg/cm$^2$.

6. A pneumatic tire as claimed in claim 1, wherein said woven multifilament fabric is a plain weave multifilament fabric.

7. A pneumatic tire as claimed in claim 1, wherein the endmost point of said woven fabric reinforcing ply is located about 10 to 60 mm farther from the bead wire bundle than the endmost point of the outside end portion of said additional reinforcing ply, and the endmost point of the outside end portion of said additional reinforcing ply is farther from the bead wire bundle than the endmost point of the outside end portion of said carcass ply.

8. A pneumatic tire as claimed in claim 1, wherein the endmost point of said woven fabric reinforcing ply is located about 10 to 20 mm farther from the bead wire bundle than the endmost point of said further woven fabric reinforcing ply.

9. A pneumatic tire as claimed in claim 1, wherein a further reinforcing ply of a metal tire cord fabric is inserted between the outside end portion of said additional reinforcing ply and said woven fabric reinforcing ply.

10. A pneumatic tire as claimed in claim 9, wherein the endmost point of the outside end portion of said additional reinforcing ply is located about 10 to 20 mm farther from the bead wire bundle than the endmost point of said additional metal tire cord reinforcing ply.

11. A pneumatic tire as claimed in claim 9, wherein a still further reinforcing ply of a woven multifilament fabric consisting of multifilament warps in a density of 20 to 65 yarns/50 mm and multifilament wefts in a density of 20 to 65 yarns/50 mm, is located in the outside surface layer of said bead portion in such a manner that said woven fabric reinforcing ply is interposed between said further additional metal tire cord reinforcing ply and said still further woven fabric reinforcing ply.

12. A pneumatic tire as claimed in claim 11, wherein the endmost point of said woven fabric reinforcing ply is located about 10 to 20 mm farther from the bead wire bundle than the endmost point of said still further woven fabric reinforcing ply.

13. A pneumatic tire as claimed in claim 9, wherein a still further reinforcing ply of a woven multifilament fabric consisting of multifilament warps in a density of 20 to 65 yarns/50 mm and multifilament wefts in a density of 20 to 65 yarns/50 mm, is located in the outside surface portion in said bead portion in such a manner that an end portion of said still further reinforcing ply is inserted between the outside end portion of said carcass ply and the outside end portion of said additional metal tire cord reinforcing ply.

14. A pneumatic tire as claimed in claim 13, wherein the endmost point of said still further woven fabric reinforcing ply is located about 10 to 20 mm farther from the bead wire bundle than the endmost point of said woven fabric reinforcing ply.

15. A pneumatic tire as claimed in claim 13, wherein a supplementary ply of a woven multifilament fabric consisting of multifilament warps in a density of 20 to 65 yarns/50 mm and multifilament wefts in a density of 20 to 65 yarns/50 mm, is arranged in the outside surface layer in said bead portion between the outside wall surface of said bead portion and said woven fabric reinforcing ply.

16. A pneumatic tire as claimed in claim 15, wherein the endmost point of said supplementary woven fabric reinforcing ply is located about 10 to 20 mm closer to the bead wire bundle than the endmost point of said woven fabric reinforcing ply.

17. A pneumatic tire as claimed in claim 9, wherein a still further reinforcing ply comprising a woven multifilament fabric consisting of multifilament warps in a density of 20 to 65 yarns/50 mm and multifilament wefts in a density of 20 to 65 yarns/50 mm, is arranged in the outside surface layer in said bead portion in such a manner that the outside end portion of said carcass ply is interposed between said still further additional woven fabric reinforcing ply and the outside end portion of said additional metal tire cord reinforcing ply.

18. A pneumatic tire as claimed in claim 17, wherein the endmost point of said still further additional woven fabric reinforcing ply is located about 10 to 20 mm farther from the bead wire bundle than the endmost point of said woven fabric reinforcing ply.

19. A pneumatic tire as claimed in claim 1 wherein said additional reinforcing ply comprises a woven multifilament fabric consisting of multifilament warps in a density of 20 to 65 yarns/50mm and multifilament wefts in a density of 20 to 65 yarns/50mm.

20. A pneumatic tire as claimed in claim 19, wherein said endmost point of said outside end portion of said additional woven fabric reinforcing ply is located 10 to 60 mm farther from the bead wire bundle than the endmost point of said outside end portion of said carcass ply.

21. A pneumatic tire as claimed in claim 20, wherein the outside end portion of said additional woven fabric reinforcing ply has an additional end portion extending from the endmost point of the outside end portion of said additional woven fabric reinforcing ply toward said bead wire bundle in such a manner that the outside end portion of said carcass ply is interposed between the additional end portion and the outside end portion of said additional woven fabric reinforcing ply.

22. A pneumatic tire as claimed in claim 21, wherein said endmost point of the outside end portion of said additional woven fabric reinforcing ply is located about 10 to 60 mm farther from the bead wire bundle than the endmost point of the outside end portion of said carcass ply.

23. A pneumatic tire as claimed in claim 19, wherein a further additional reinforcing ply is arranged along the outside end portion of said carcass ply in such a manner that the outside end portion of the carcass ply is interposed between said further additional reinforcing ply and the outside end portion of the additional woven fabric reinforcing ply, said further additional reinforcing ply comprising a woven multifilament fabric consisting of multifilament warps in a density of 20 to 65 yarns/50 mm and multifilament wefts in a density of 20 to 65 yarns/50 mm.

24. A pneumatic tire as claimed in claim 23, wherein the endmost point of the outside end portion of said additional woven fabric reinforcing ply is located about 20 to 40 mm farther from the bead wire bundle than the endmost point of the further additional reinforcing ply.

25. A pneumatic tire as claimed in claim 1 wherein said additional reinforcing ply comprises a metal tire cord fabric, and one reinforcing ply is located in said outside surface layer of the bead portion.

26. A pneumatic tire as claimed in claim 1 wherein said warps and wefts of said woven multifilament fabric are composed of synthetic multifilaments consisting of metal.

27. A pneumatic tire as claimed in claim 26, wherein said fiber-forming metal is steel.

* * * * *